United States Patent [19]

Kusaka

[11] Patent Number: 4,474,449
[45] Date of Patent: Oct. 2, 1984

[54] AUTOMATIC FOCUSING DEVICE
[75] Inventor: Yosuke Kusaka, Kawasaki, Japan
[73] Assignee: Nippon Kagaku K.K., Tokyo, Japan
[21] Appl. No.: 417,169
[22] Filed: Sep. 13, 1982
[30] Foreign Application Priority Data Sep. 24, 1981 [JP] Japan ............................ 56-151104

[51] Int. Cl.³ .............................................. G03B 3/10
[52] U.S. Cl. .................................................. 354/408
[58] Field of Search ................. 354/25, 402, 406, 408

[56] References Cited
U.S. PATENT DOCUMENTS 4,331,864 5/1982 Nakajima et al. ............... 354/25 X
4,333,007 6/1982 Langlais et al. ................. 354/25 X
4,408,288 10/1983 Kondo et al. .................... 354/25 X Primary Examiner—Michael L. Gellner
Attorney, Agent, or Firm—Shapiro and Shapiro

[57] ABSTRACT

An automatic focusing device is capable of providing stable operation in a range close to the in-focus position, without degrading resopnse outside the range. In the focusing device, a photographic lens is driven, outside a range close to the in-focus position, according to a focusing signal, but, within said range, according to a control signal so modified as not to reflect very fast changes in the focusing signal.

10 Claims, 6 Drawing Figures

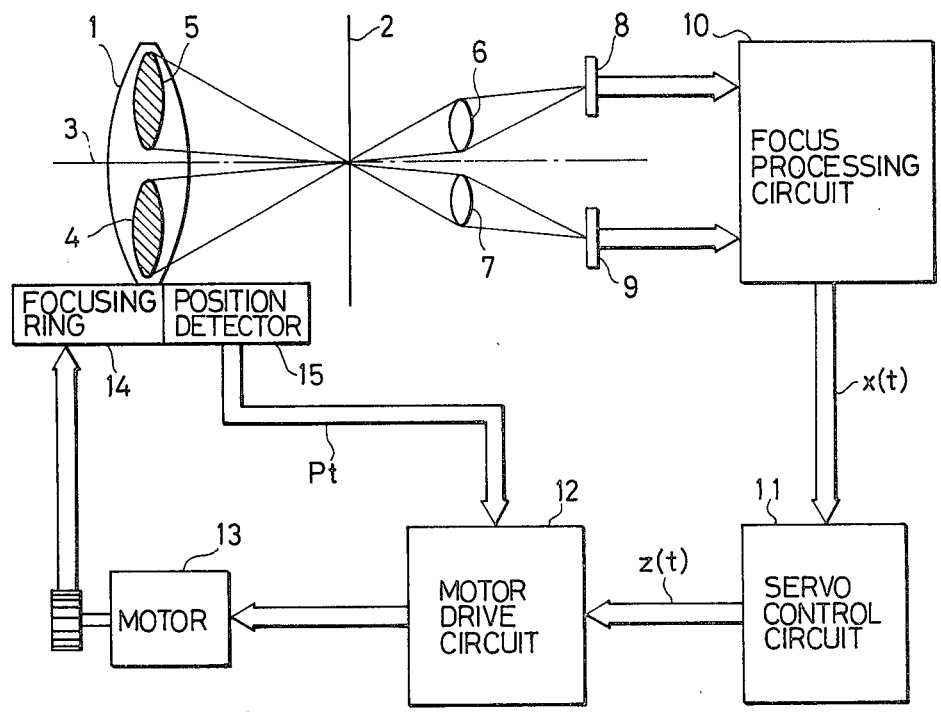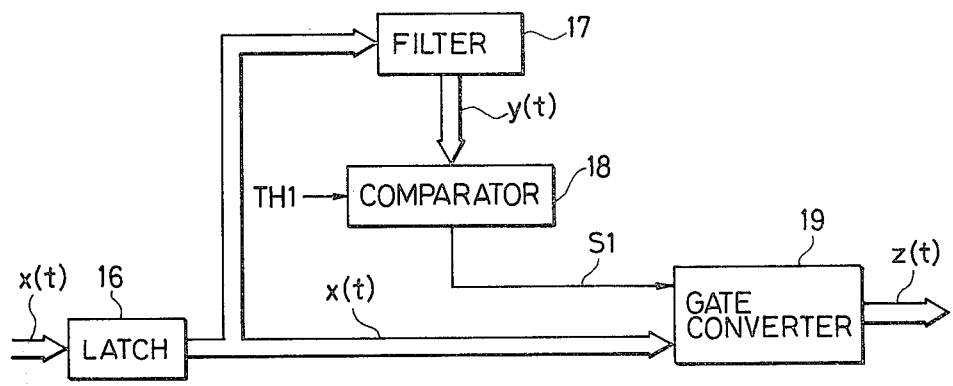

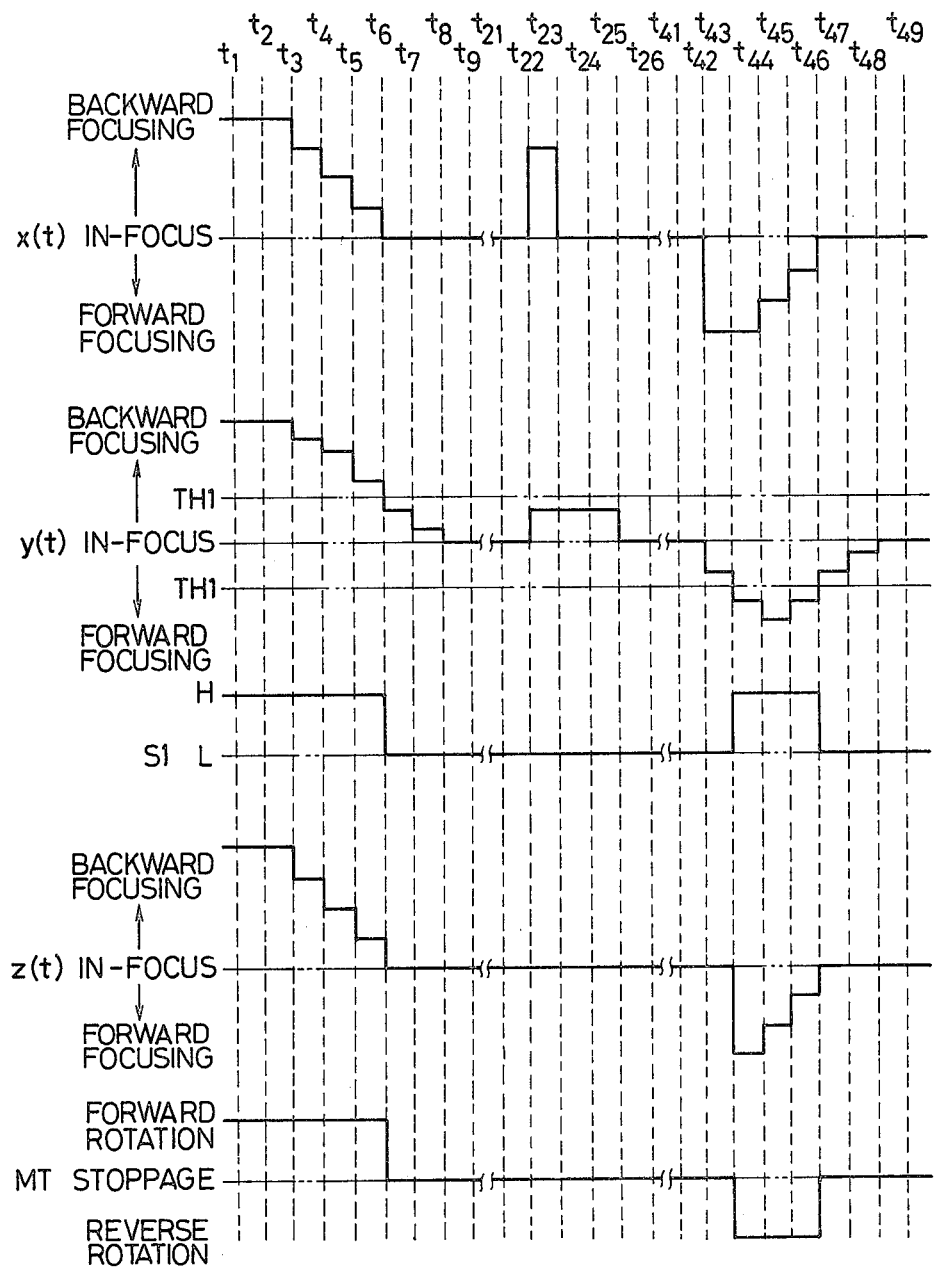

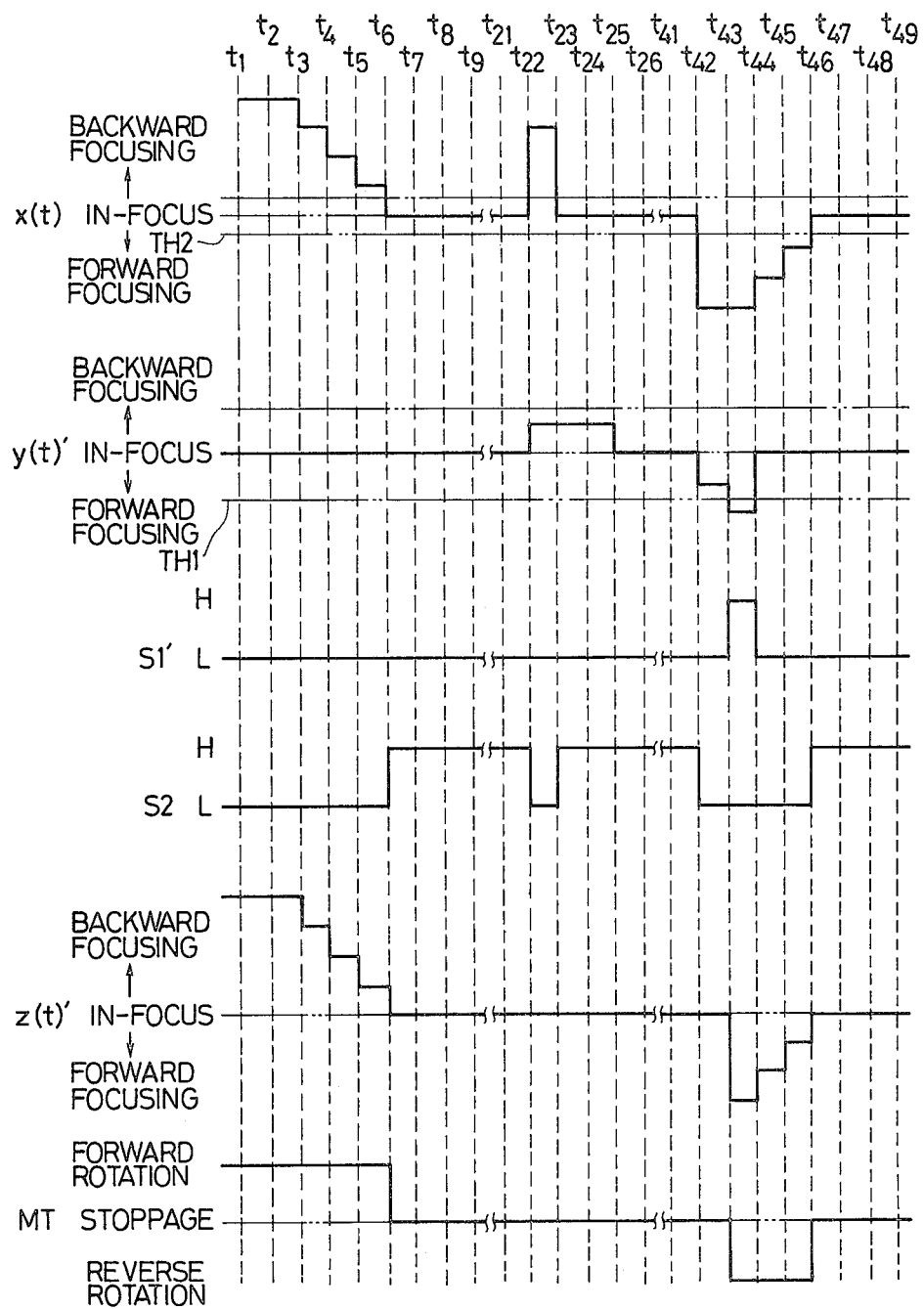

AUTOMATIC FOCUSING DEVICE

BACKGROUND OF THE INVENTION

1. Field of the Invention

The present invention relates to an automatic focusing device.

2. Description of the Prior Art

Conventionally known automatic focusing devices are designed to generate control information representing a target for a servo system for moving a photographic lens to an in-focus position, in response to a photoelectrically converted output signal derived from an image of an object formed for example on a solid-state image sensor.

However, when such control information is directly used for servo control, the servo system may receive unexpected inappropriate control information within a very short period due to noise generated in the device, shaking of the camera or momentary movement of the object. Thus, when the photographic lens is in the vicinity of the in-focus position, the focusing device may respond to such inappropriate control signal so that the photographic lens is first brought to an out-of-focus position and then to the in-focus position. Stated differently the conventional focusing devices are subject to unstable operation when the photographic lens is in a range close to the in-focus position.

Such unstable operation can be prevented by filtering the control signal in order to eliminate the sudden inappropriate signal generated for a very short period, thus ensuring smooth servo control. In such case, however, the servo system operates with a certain delay in response, thus resulting in a reduced responsive ability of the automatic focusing device. Such delay is often not permissible, particularly outside the range close to the in-focus position.

SUMMARY OF THE INVENTION

An object of the present invention is therefore to provide an automatic focusing device capable of providing stable operation in a range close to the in-focus position, without degrading the response outside said range. The above-mentioned object can be achieved according to the present invention by a focusing device in which the photographic lens is driven, outside a range close to the in-focus position, according to a focusing signal, but, within said range, according to a control signal so modified as not to reflect very fast changes in the focusing signal.

BRIEF DESCRIPTION OF THE DRAWINGS

FIG. 1 is a block diagram of an entire automatic focusing device embodying the present invention;

FIG. 2 is a block diagram showing an embodiment of the servo control shown in FIG. 1;

FIG. 4 is a timing chart showing the operation of the foregoing embodiment;

FIG. 6 is a timing chart showing the operation of the further embodiment.

DETAILED DESCRIPTION OF THE PREFERRED EMBODIMENTS

Figure 3:
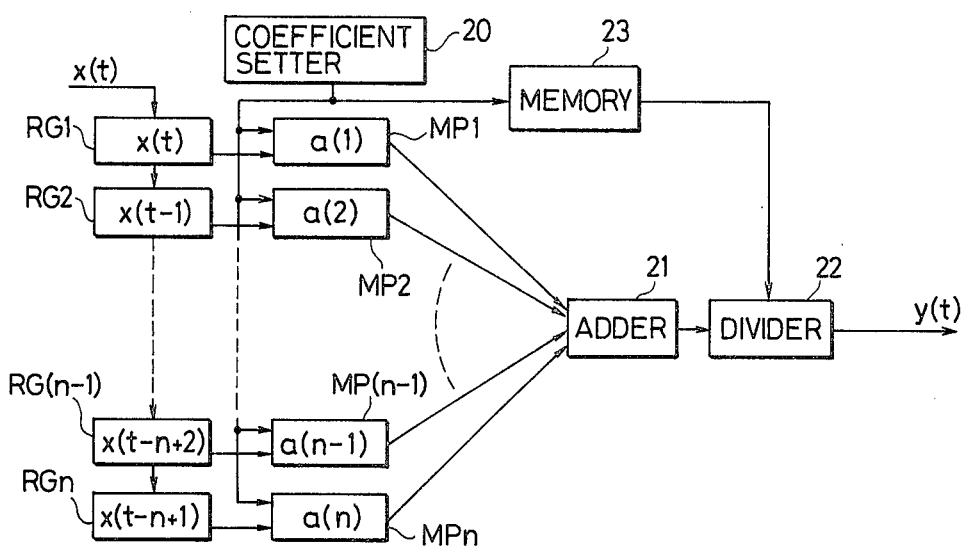
FIG. 3 is a block diagram showing the structure of the filter shown in FIG. 2.

Reference is now made to FIG. 1 showing an embodiment of the present invention, wherein the light from an object enters a photographic lens 1 to form an image of the object on a predetermined focal plane 2. Two light beams of said light, passing through two areas 4, 5 symmetrical to the optical axis 3 of said lens 1 and forming the object image on the focal plane 2, are further transmitted through relay lenses 6, 7 to again form images of the object on photoelectric converting elements 8, 9.

The object images respectively formed on said photoelectric converting elements 8, 9 are subjected to photoelectric conversion, and the resulting signals are supplied to a focus processing circuit 10. Said circuit 10 detects the relative positions of the reformed object images by processing the photoelectric converted signals from the photoelectric converting elements 8, 9, thus obtaining information on whether the photographic lens is in focus, forward focusing or backward focusing, and on the amount of displacement of the lens 1 from the in-focus position, and generates a servo signal $x(t)$ in response to said information, for displacing said lens 1 to the in-focus position by a motor 13. Said servo signal $x(t)$ includes a sign indicating the front-focused state or the back-focused state, and an absolute value representing the amount of displacement of the photographic lens 1 from the in-focus position. The focus-detecting optical system, photoelectric converters and circuit 10 are not limited to the above-described structure but can be of any type capable of providing information on the front- or back-focused state and the amount of displacement mentioned above.

In the following explanation the servo signal $x(t)$ is assumed to be an intermittently changing signal because the photoelectric converting elements 8, 9, if composed of charge accumulating elements such as CCD's, will require a certain charge-accumulating time and a certain signal readout time, and the focus processing circuit 10, if composed of a microcomputer, will require a certain data processing time. Nevertheless said servo signal $x(t)$ may be a continuously changing signal.

Said servo signal $x(t)$ contains inappropriate components spontaneously generated within a very short time, for example by a shaking of the camera or by noises generated in the device, and such components will hereinafter be referred to generally as noise. A servo control circuit 11 converts the noise-containing servo signal $x(t)$ into a noise-free servo signal $z(t)$ for achieving stable function of the automatic focusing device.

In response to said servo signal $z(t)$ from the servo control signal 11, a motor drive circuit 12 activates the motor 13, thus driving the photographic lens 1, through a focusing ring 14 thereof, toward the in-focus position along the optical axis of said lens.

There is already known a feedback system in which a position detector 15, comprising a signal code plate or a resistor, detects the position of the photographic lens 1 through the focusing ring thereof and transmits positional information Pt indicating the position of said lens 1 to the motor drive circuit 12. Said circuit 12 memorizes the received servo signal $z(t)$, then compares it with the positional information Pt from the position detector 15 and stops the motor 13 when the two mutually coincide, thus fixing the photographic lens 1 at the in-focus position. During the above-described comparing process, the motor drive circuit does not accept the new servo signal z(t).

The position control for the photographic lens 1 in the above-mentioned embodiment is achieved through a closed feedback loop for the positional information Pt of the lens 1, but said position control may also be effected through a feedback loop involving an optical system such as through the photographic lens 1 if the delay in response in the photoelectric converting elements 8, 9 and in the focus processing circuit 10 is negligibly small so that the servo signal z(t) can follow the movement of the lens 1 in a practically real-time condition.

In such case the position detector 15 including the signal code plate or resistor for entering the lens position and the positional information Pt can be dispensed with.

FIG. 2 shows the structure of the servo control circuit 11 shown in FIG. 1.

The servo signal x(t) from the focus processing circuit 10 is first latched by a latch 16, and is then filtered by a filter 17, which thus outputs a filtered servo signal y(t). Said filtered servo signal y(t) is compared with a threshold level TH1 in a comparator 18, which outputs a gate control signal S1 according to the result of said comparison. The gate control signal S1 assumes the low (L) level or high (H) level respectively when the servo signal y(t) is lower or higher than the threshold level TH1. A gate converter 19 converts the servo signal x(t) from the latch 16 into a servo signal z(t) according to said gate control signal S1. More specifically said gate converter 19 generates a lens stop signal z(t)=0 when the gate control signal S1 is at the L-level, and a signal z(t)=x(t) when said signal S1 is at the H-level.

FIG. 3 shows the details of the filter 17 shown in FIG. 2.

Said filter 17 is composed of n shift registers RG1−RGn, n multipliers MP1−MPn, a coefficient setter 20, an adder 21, a divider 22 and a memory 23 for calculating a weighted average of the servo signals x(t). Said shift registers RG1−RGn constitute a shift register stack, and each shift register is adapted to store one signal x(t). Plural values are previously given for each of the coefficients $a_1-a_n$ of the multipliers MP1−MPn, and said coefficient setter 20 selects one of said values for each coefficient. Also plural values are given for the sum of said coefficients $\Sigma a_n = a_1 + a_2 + \ldots + a_n$ in the memory 23, and the coefficient setter 20 selects a value corresponding to the selected coefficients $a_1-a_n$. The aforementioned servo signal x(t) is supplied in succession through the latch 16 and successively stored in the shift registers RG1−RGn. Consequently, at a time t, the shift registers RG1−RGn store n servo signals x(t)−x(t−n+1) received in the past. The multipliers MP1−MPn respectively multiply the servo signals stored in the corresponding shift registers with the corresponding coefficients $a_1-a_n$. Said coefficients are determined automatically or manually by the coefficient setter 20 according to the information on the luminance of the object, information on the distance to the object, selection of the operator or combinations thereof.

For example, an object of a low luminance will require a longer charge accumulating time in the photoelectric converting elements 8, 9, if they are of the charge accumulating type, thus degrading the response of the device. In order to avoid such degraded response, the coefficients $a_{n-r}-a_n$ among the above-mentioned coefficients $a_1-a_n$ are selected as zero and the value of r is selected smaller as the luminance increases. In this manner the filtering operation is effected on a larger number of past servo signals x(t) for a high-luminance object and on a smaller number of past servo signals x(t) for a low-luminance object.

The output signals of the multipliers MP1−MPn are added by the adder 21 and subsequently supplied to the divider 22. The divider 22 divides the output signal of said addition $a_1x(t) + a_2x(t-1) + \ldots + a_nx(t-n+1)$ with the output signal $\Sigma a_n$ from the memory 23, thus providing a filtered and weighted average servo output signal $y(t) = \{a_1x(t) + a_2x(t-1) + \ldots + a_nx(t-n+1)\}/\Sigma a_n$.

Now the operation of the device in the present embodiment will be explained in the following with reference to the timing chart shown in FIG. 4. It is however assumed that the feedback mechanism involving the position detector 15 as shown in FIG. 1 is not present, that the photoelectric converting elements 8, 9 and the focus processing circuit 10 have no delay in response and that the position control for the photographic lens 1 is conducted through a feedback loop involving an optical system such as said lens 1.

At a time t1 the photographic lens 1 shown in FIG. 1 is in the backward focusing state, so that the focus processing circuit 10 outputs a servo signal x(t) having a sign representing the backward focusing state and an absolute value representing the amount of displacement from the in-focus state. Said servo signal x(t) is latched by the latch shown in FIG. 2, and is also supplied to the filter 17. In this state the servo output signal y(t) filtered by the filter 17 is higher than the threshold level TH1 so that the gate control signal S1 is in the High-level state. As already explained before, the gate converter 19 outputs a servo signal z(t)=0 representing the in-focus state when the gate control signal S1 is at the Low-level state but outputs a servo signal z(t)=x(t) when said signal S1 is at the High-level state. Consequently, in the above-mentioned state, the gate converter 19 outputs the servo signal z(t)=x(t).

In response to said servo signal z(t)=x(t), the motor drive circuit 12 shown in FIG. 1 drives the motor 13 to displace the photographic lens 1 from the backward focusing position toward the in-focus position. As the lens 1 approaches the in-focus position, the absolute value of the servo signal x(t), and hence that of the filtered servo signal y(t) are reduced.

At a time t6 the filtered servo signal y(t) becomes lower than the threshold level TH1, whereby the gate control signal S1 from the comparator 18 assumes the Low-level state and the gate converter 19 outputs a servo signal z(t)=b 0. Consequently the motor drive circuit 12 stops the motor 13, whereby the photographic lens 1 is fixed in the vicinity of the in-focus position.

Now there will be explained the operation when noise is added to the servo signal x(t) while the photographing lens 1 is at the in-focus position.

Even when noise is added to the servo signal x(t) at a time t22 as shown in FIG. 4, the filtered servo signal y(t) remains below the threshold level TH1, so that the gate control signal S1 from the comparator 18 remains at the Low-level state and the gate converter 19 therefore continues to output a servo signal z(t)=0. Consequently the motor drive circuit 12 does not activate the motor 13, and the photographic lens 1 is not moved from the in-focus position.

Then there will be explained the operation when the photographic lens 1, originally in focus, becomes out of focus because of a change in the conditions, for example a movement in the position of the object or of the camera.

In FIG. 4 it is assumed that the photographic lens 1 is in the in-focus position until a time t41 but becomes forward focusing thereafter so that the servo signal x(t) assumes a state representing the forward focusing position at a time t42. However the filtered servo signal y(t) still remains below the threshold level TH1 to provide a servo signal z(t)=0. Consequently the motor 13 is not activated immediately and the photographic lens 1 remains at standstill.

If the servo signal x(t) remains in the forward focusing state in a succeeding time t43, the filtered servo signal y(t) exceeds the threshold level TH1, whereby the gate control signal S1 from the comparator 18 is shifted to the High-level state to output a servo signal z(t)=x(t) from the gate converter 19.

Thus the motor drive circuit 12 activates the motor 13 to displace the photographic lens 1 from the forward focusing position toward the in-focus position.

As the photographic lens 1 approaches the in-focus position by the movement according to the servo signal z(t)=x(t), the filtered servo signal y(t) becomes lower than the threshold lever TH1 at a time t46, whereby the gate control signal S1 from the comparator 18 is shifted to the Low-level state to obtain a servo signal z(t)=0 from the gate converter 19. Thus the motor drive circuit 12 stops the motor 13, and the lens 1 is therefore fixed in the vicinity of the in-focus position.

Figure 5:
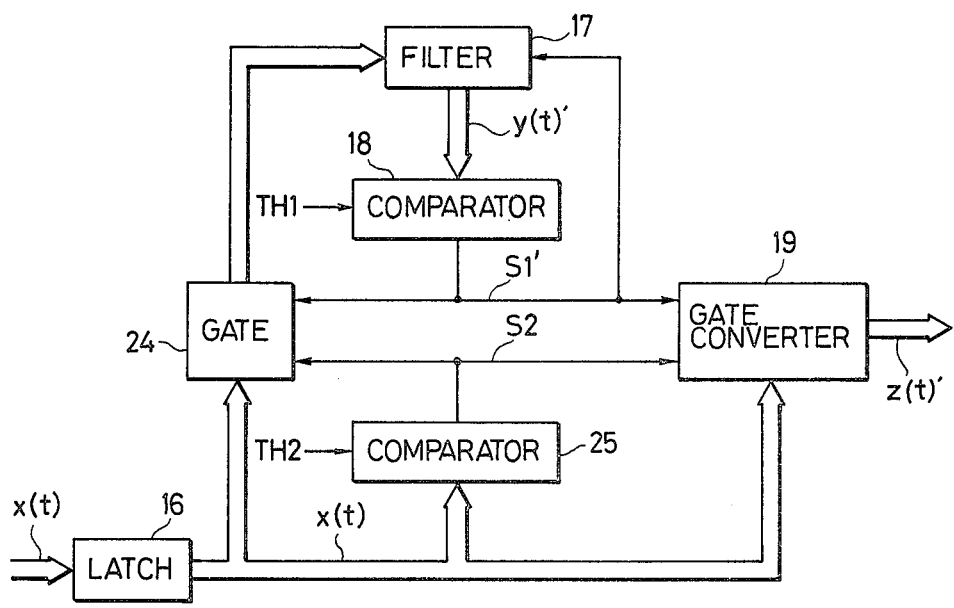
FIG. 5 is a block diagram showing a further embodiment of the servo control circuit shown in FIG. 1.

FIG. 5 is a block diagram showing another embodiment of the servo control circuit 11, wherein a latch 16 latches the servo signal x(t) entered from the focus processing circuit 10 shown in FIG. 1. A gate 24 controls the passage of said servo signal x(t) from the latch 16, in response to a gate control signal S1' and another gate control signal S2. A filter 17 is provided for filtering the servo signal x(t) gated by said gate 24. A comparator 18 compares the filtered servo signal y(t)' with the threshold level TH1 and outputs the gate control signal S1' according to the result of said comparison. Also a comparator 25 compares the servo signal x(t) from the latch 16 with a threshold level TH2 and outputs the gate control signal S2 according to the result of said comparison. In response to the gate control signals S1' and S2, a gate converter 19 converts the servo signal x(t) from the latch 16 into a servo signal z(t)'. The above-described procedure will be explained further in the following.

The servo signal x(t) from the focus processing circuit 10 is latched in the latch 16, and is then supplied to the gate 24, comparator 25 and gate converter 19. Said gate 24 is opened at the rising end of the gate control signal S2 to transmit said servo signal x(t), and is closed at the rising end of the gate control signal S1' to intercept said servo signal x(t).

Also the gate converter 19 outputs a servo signal z(t)'=0 representing the in-focus state at the rising end of the gate control signal S2, and outputs a servo signal z(t)'=x(t) at the rising end of the gate control signal S1'.

At an initial state, for example when the power supply is turned on, the gate 24 is closed but the gate converter 19 is open and outputs a servo signal z(t)'=x(t).

The comparator 25 outputs a Low-level or High-level signal respectively when the servo signal x(t) is higher or lower than the threshold level TH2. Also the comparator 18 outputs Low-level or High-level signal respectively when the servo signal y(t)' is lower or higher than the threshold level TH1.

The filter generates the signal y(t)' by filtering H) the servo signal x(t) from the gate 24 in the same manner as in the foregoing embodiment.

Now there will be given an explanation of the operation of the device shown in FIG. 5, with reference to the timing chart shown in FIG. 6. In this case, however, it is again assumed that the position detector 15 is not present and that the control is conducted through a feedback loop involving an optical system such as the photographic lens 1.

It is assumed that the photographic lens 1 is at a backward focusing position at a time t1, so that the focus processing circuit 10 outputs servo signal x(t) representing a backward focusing state.

Thus the servo signal x(t) is higher than the threshold level TH2, and the gate control signal S2 is in the Low-level state. The gate converter 19 therefore outputs a servo signal z(t)'=x(t), whereby the motor drive circuit 12 activates the motor 13 to displace the photographic lens 1 from the backward focusing position toward the in-focus position. As the lens 1 approaches the in-focus position, the absolute value of the servo signal x(t) is reduced.

At a time t6 when the servo signal x(t) becomes lower than the threshold level TH2, the gate control signal S2 from the comparator 25 is shifted to the High-level state, and the gate converter 19 outputs a servo signal z(t)'=0 at the rising end of said gate control signal. Consequently the motor drive circuit 12 stops the motor 13 to fix the photographic lens 1 in the vicinity of the in-focus position.

Also at the rising end of the gate control signal S2, the gate 24 is opened to supply the servo signal x(t) to the filter 17.

The filter 17 has a structure for example as explained in FIG. 3, and, at the initial state, each of the registers RG1–RGn is reset to zero. In this state the gate control signal S1' from the comparator 18 is at the Low-level state since the filtered servo signal y(t)' is lower than the threshold level TH1.

In the foregoing there has been explained the control procedure for the lens movement from an out-of-focus position toward the in-focus position.

Now there will be explained the function of the device when noise is added to the servo signal x(t) while the photographic lens 1 is at the in-focus position.

It is assumed that the noise is added to the servo signal x(t) at a time t22, but the filtered servo signal y(t)' still remains lower than the threshold level TH1, so that the gate control signal S1' from the comparator 18 remains at the Low-level state. Consequently the gate converter continues to output a servo signal z(t)'=0. Thus the motor drive circuit 12 does not activate the motor 13, and the photographic lens 1 is maintained at the in-focus position.

Then there will be explained the operation when the photographic lens 1 becomes out of focus by a change in the conditions, for example a change in the position of the object or of the camera.

It is assumed that the photographic lens 1 is in focus at a time t41 but becomes forward focusing by a change in the condition whereby the servo signal x(t) assumes a state representing the forward focusing position at a time t42.

In such state, however, the filtered servo signal y(t)' remains lower than the threshold level TH1 to obtain a servo signal z(t)'=0. Consequently the motor 13 is not activated and the photographic lens remains at standstill.

When the servo signal x(t) remains in the forward focusing state at a succeeding time t43, the filtered servo signal y(t)' exceeds the threshold level TH1 whereby the gate control signal S1' from the comparator 18 is shifted to the High-level state. At the rising end of said signal, the gate converter starts to output a servo signal z(t)'=x(t).

Consequently the motor drive circuit 12 activates the motor 13 to displace the photographic lens 1 from the forward focusing position toward the in-focus position. Also at the rising end of the gate control signal S1' the gate 24 is closed to inhibit the transmission of the servo signal x(t) to the filter 17 and to reset said filter 17. Thus each of the registers RG1–RGn shown in FIG. 3 is reset to zero. In this manner the filter 17 is activated only in a range close to the in-focus position.

As the lens 1 approaches the in-focus position by the displacement thereof according to the servo signal z(t)'=x(t), the servo signal x(t) becomes lower than the threshold level TH2 at a time t46, whereby the gate control signal S2 from the comparator 25 is shifted to the High-level state. At the rising end of said signal the gate converter 19 starts to output a servo signal z(t)=0, whereby the motor drive circuit 12 stops the motor 13 to fix the photographic lens 1 in the vicinity of the in-focus position.

Also at the rising end of the gate control signal S2, the gate 24 is again opened to transmit the servo signal x(t) to the filter 17.

Consequently the photographic lens remains fixed in the vicinity of the in-focus position until the filtered servo signal y(t)' exceeds the threshold level TH1 next time. As explained in the foregoing, in the second embodiment of the present invention, the in-focus position is detected in a movement from the outside to the inside of a range close to said in-focus position by means of the comparator 25 according to the value of the servo signal x(t), while a movement from the inside to the outside of said range is detected by the comparator 18 according to the output signal of the filter 17.

In comparison with the embodiment shown in FIG. 2, that shown in FIG. 5 is advantageous for an accurate position control of the lens 1, since the stop position thereof can be directly regulated by the selection of the threshold level TH2 with respect to the servo signal x(t).

In the foregoing embodiments shown in FIGS. 2 and 5, the threshold levels TH1, TH2 of the comparators 18, 25 should be experimentally determined. It is also possible to render said threshold levels TH1, TH2 variable according to the luminance of the object, focal length and diaphragm aperture of the photographic lens or the selection of the operator.

As explained in the foregoing, the gate converter outputs a servo signal z(t)=0 or z(t)'=0 as the lens stop signal respectively in the first or second embodiment when the lens reaches the in-focus position, but said gate converter may also be designed to emit a servo signal z(t)=y(t) or z(t)'=y(t)' wherein y(t) or y(t)' indicates a filtered servo signal. In such case the motor is not immediately stopped but decelerated gradually since the signal y(t) declines gradually.

Also in the foregoing embodiments it will be readily understood that the servo signals and the signal processing circuits may be either of analog form or of digital form.

Also in the foregoing embodiments the focus processing circuit 10 and the servo control circuit 11 are explained as separate circuits for the ease of explanation, but the functions of these circuits may be united through use of microcomputer software.

I claim:

1. In a focusing control device having detecting means for time-sequentially generating detection signals varying in accordance with the positional relationship between a predetermined image plane and an image plane of an object formed through an imaging optical system, and means for driving said imaging optical system based on said detection signals so that the image of said object and said predetermined image plane can be caused to coincide, the improvement comprising:
   (a) means for averaging said sequential detection signals and generating an average signal;
   (b) means for discriminating, based on the average signal, that the image of said object is within a range close to said image plane and generating a discriminating signal; and
   (c) means for impeding said driving means from driving said imaging optical system in response to said discriminating signal.

2. A focusing control device according to claim 1, wherein said averaging means includes means for memorizing a plurality of said detection signals and means for weighted-averaging said memorized detection signals.

3. A focusing control device according to claim 1, wherein said impeding means includes gate means for transmitting said detection signals to said driving means, the gate means stopping transmission of said detection signals in response to said discriminating signal.

4. In a focusing control device having detecting means for time-sequentially generating detection signals varying in accordance with the positional relationship between an image of an object formed through an imaging optical system and a predetermined image plane, and means for driving said imaging optical system based on said detection signals in order to cause the image of said object to coincide with said predetermined image plane, the improvement comprising:
   (a) means for averaging said time-sequential signals and generating an average signal;
   (b) a first discriminating means for discriminating, based on said detection signals, that the image of said object is within a range close to said image plane and generating a first discriminating signal;
   (c) a second discriminating means for discriminating, based on said average signal, that the image of said object is outside the range close to said image plane and generating a second discriminating signal; and
   (d) means for impeding said driving means from driving said imaging optical system in response to said first discriminating signal and for permitting said driving means to drive said imaging optical system in response to said second discriminating signal.

5. A focusing control device according to claim 4, wherein said averaging means includes means for memorizing a plurality of said detection signals and means for weighted-averaging said memorized detection signals.

6. A focusing control device according to claim 4, wherein said impeding means includes gate means for transmitting said detection signals to said driving means, the gate means stopping transmission of said detection signals to said driving means in response to said first discriminating signal and initiating transmission of said detection signals to said driving means in response to said second discriminating signal.

7. In a focusing control device having detecting means for generating time-sequentially detection signals in accordance with the positional relationship between an image of an object formed through an imaging optical system and a predetermined image plane, and means for driving said imaging optical system based on said detection signals in order to cause the image of said object to coincide with said predetermined image plane, the improvement comprising:
   (a) means for averaging said detection signals and generating an average signal;
   (b) means for discriminating that said average signal is above a predetermined value and generating a discriminating signal; and
   (c) control means for generating a drive signal for activating said drive means in response to said detection signals when said object image is located outside a range close to said predetermined image plane, for generating a stop signal for stopping said drive means in response to movement of said object image from outside to inside of said range close to said predetermined image plane, and for generating said drive signal in response to said discriminating signal after said object image has become located within said range close to said predetermined image plane.

8. A focusing control device according to claim 7, wherein said control means includes gate means for transmitting said detection signals to said driving means in response to said discriminating signal and stopping transmission of said detection signals to said means, the gate means stopping transmission of said detection signals to said drive means when said discriminating means does not generate said discriminating signal.

9. A focusing control device according to claim 7, wherein said control means includes means for comparing said detection signals with a reference value and generating a comparison signal when said detection signals are below said reference value, and gate means for transmitting said detection signals to said driving means in response to said discriminating signal and stopping transmission of said detection signals to said means in response to said comparison signal.

10. A focusing control device according to claim 7, wherein said averaging means includes means for memorizing a plurality of said detection signals and means for weighted-averaging said memorized detection signals.

* * * * *